United States Patent

Kishi et al.

[11] Patent Number: 6,072,621
[45] Date of Patent: Jun. 6, 2000

[54] COLORED BALL DISPLAY SYSTEM

[75] Inventors: Etsurō Kishi, Sagamihara; Takayuki Yagi, Yokohama; Tsutomu Ikeda, Hachiohji, all of Japan

[73] Assignee: Canon Kabushiki Kaisha, Tokyo, Japan

[21] Appl. No.: 09/245,353

[22] Filed: Feb. 5, 1999

[30] Foreign Application Priority Data

Feb. 6, 1998 [JP] Japan ................... 10-025523

[51] Int. Cl.[7] .................. G02B 26/00
[52] U.S. Cl. .......... 359/296; 359/295; 345/85; 345/107; 623/16
[58] Field of Search .................. 359/295, 296; 345/84, 85, 107; 264/4, 232; 623/16; 433/173; 428/323

[56] References Cited

U.S. PATENT DOCUMENTS

| | | | |
|---|---|---|---|
| 4,126,854 | 11/1978 | Sheridon | 340/373 |
| 4,143,103 | 3/1979 | Sheridon | 264/4 |
| 5,389,945 | 2/1995 | Sheridon | 345/85 |
| 5,759,205 | 6/1998 | Valentini | 623/16 |
| 5,940,054 | 8/1999 | Harris | 345/85 |
| 5,986,629 | 11/1999 | Smith et al. | 345/84 |

FOREIGN PATENT DOCUMENTS 7-168210  7/1995  Japan.

OTHER PUBLICATIONS

N.K. Sheridon, et al., "The Gyricon–A Twisting Ball Display", Proceeding of S.I.D., vol. 18/3 & 4, pp. 289–293 (1977).

M. Saitoh, et al., "A Newly Developed Electrical Twisting Ball Display", Proceedings of the S.I.D., vol. 23/4, pp. 249–253 (1982).

*Primary Examiner*—Loha Ben
*Attorney, Agent, or Firm*—Fitzpatrick, Cella, Harper & Scinto

[57] ABSTRACT

In a display device of the type wherein a display state is selected by rotation of polarized colored balls, the colored balls are formed from a paraelectric material, and the charged state of each colored ball is provided by an electret-forming treatment due to charge-injection to a minute colored ball per se of a paraelectric material or a film of a paraelectric material coating a minute ball. As a result, a colored ball having an increased charge can be produced stably from an inexpensive material.

14 Claims, 9 Drawing Sheets

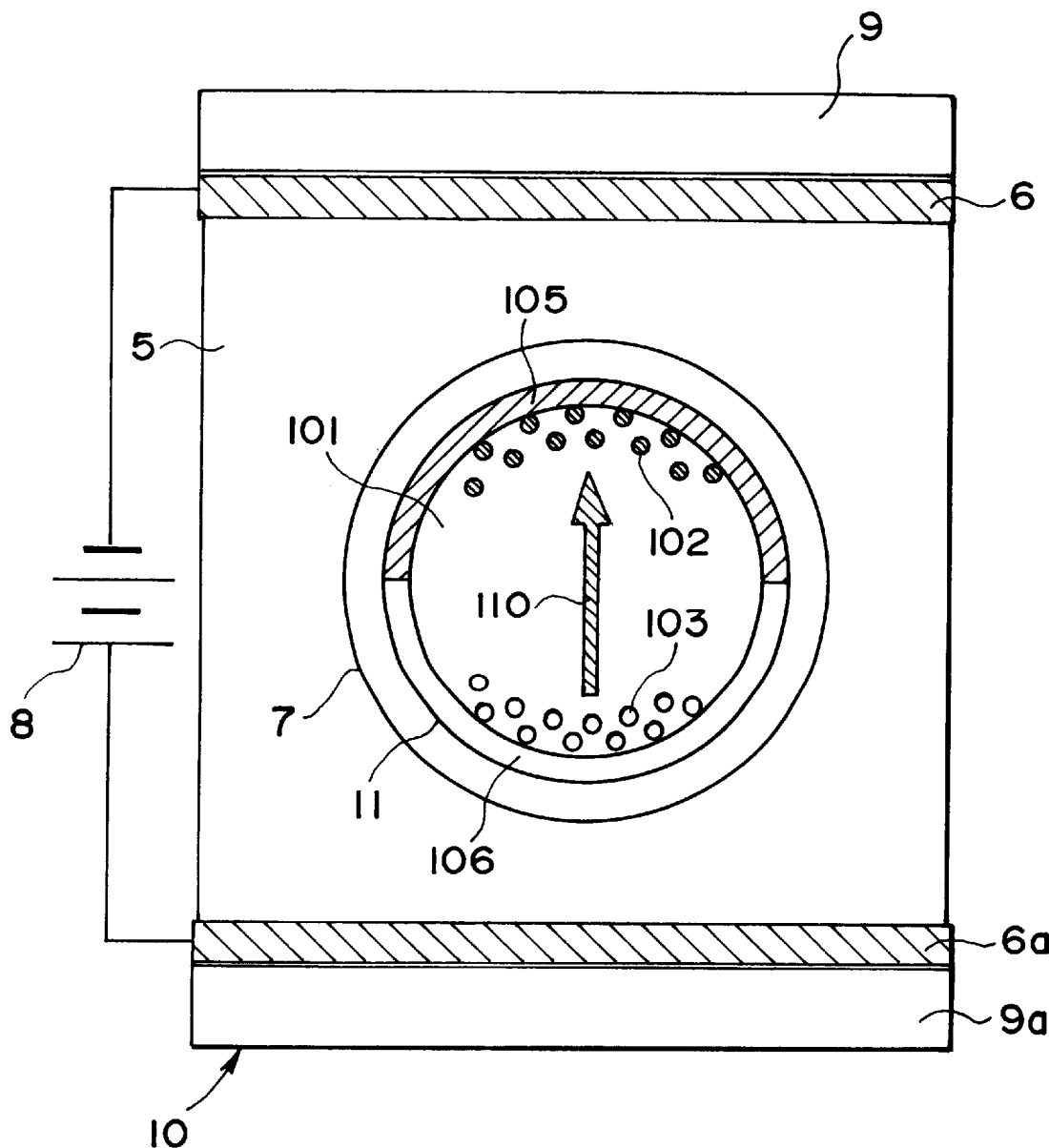
F I G. 7

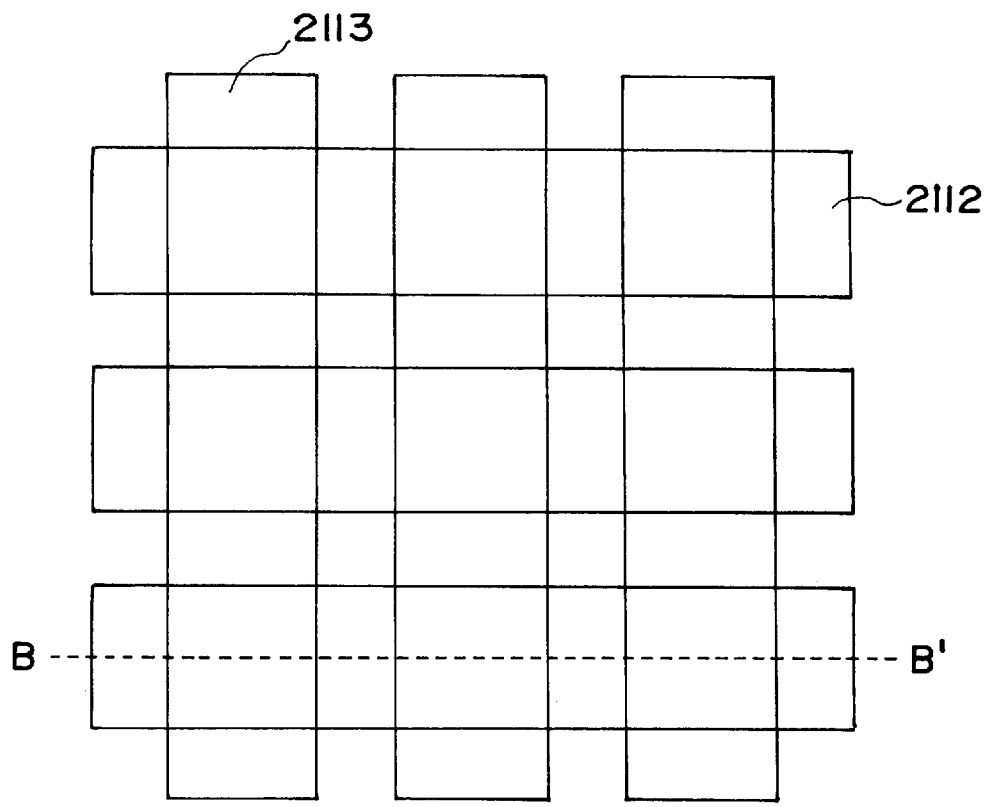
F I G. 9A
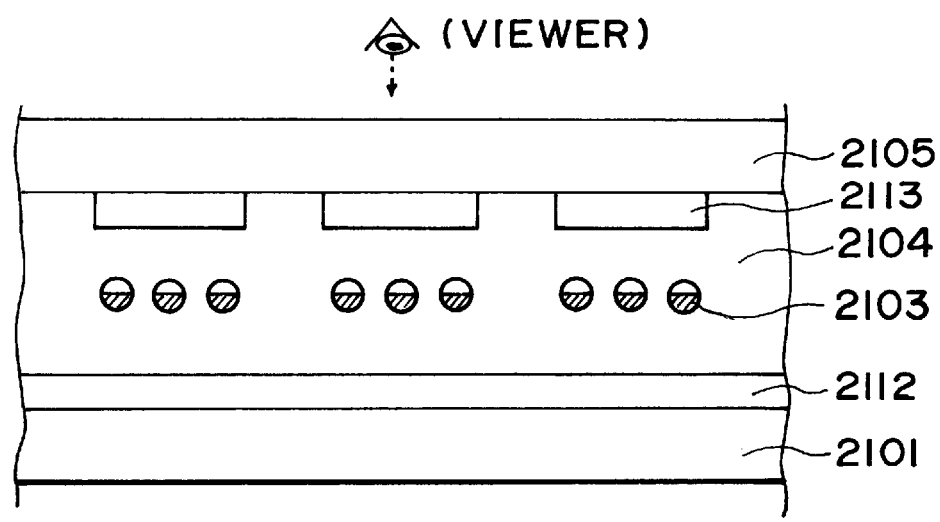
F I G. 9B

COLORED BALL DISPLAY SYSTEM

FIELD OF THE INVENTION AND RELATED ART

The present invention relates to a colored ball having two surfaces of different optical characteristics, a display device for effecting a display by twisting such colored balls, a process for producing such a colored ball, and a process for producing such a display device.

In recent years, accompanying the progress of data processing apparatus, there has been an increasing demand for a display device requiring a small power consumption and a small thickness, and extensive study and development has been made on devices satisfying such a demand. Among these, a liquid crystal display device wherein an alignment of liquid crystal molecules is electrically controlled to change optical characteristics has been extensively developed and commercialized as a display device satisfying the demand described above. However, the current liquid crystal display devices are still accompanied with problems of visual load on human eyes, such as difficulty of recognizing characters on display depending on a viewing angle or due to reflection light, and flickering and low luminance of light sources. Accordingly, extensive study is still made for new-types of display devices causing less visual load on human eyes.

As a new type of display device, a display device utilizing minute balls twisting or rotating under an electric field has been proposed by N. K. Sheridon, et al. ("A twisting Ball Display"), Proc. of the SID), Vol. 18, No. 3/4, pp. 289–293 (1977); U.S. Pat. Nos. 4,126,854, 4,143,103 and 5,389,945, and Japanese Laid-Open Patent Application (JP-A) 64-42683). In the display device, minute balls each having a white hemisphere and a black hemisphere are disposed in cavities formed in a substrate and filled with a high resistance liquid, so that the minute balls are allowed to twist or roate in the liquid. Typically, the minute balls have a diameter on the order of 50–200 $\mu$m.

Sheridon, et. al. mentioned above, have proposed to provide colored balls by first providing white glass balls containing $TiO_2$ at a high density and forming an insulating black layer on a hemispherical surface of each white ball by vacuum deposition. Further, Saito, et al. ("A Newly Developed Electrical Twisting Ball Display", Proc. of the SID, pp. 249–253 (1982)) also have proposed a similar process for preparing two-colored balls, i.e., by providing white glass balls and then simultaneously depositing $MgF_2$ and $Sb_2S_3$ to form a black layer on a hemisphere of each white ball. For providing the white balls, a glass comprising three components of $LiO_2$, $TiO_2$ and $SiO_2$ is heat-treated to cause a component separation causing light scattering, thereby providing a surface state composed of different components.

FIG. 4A illustrates a typical organization of such a known minute colored ball 401. A minute ball 401 has thereon a surface layer including at least one hemispherical surface comprising a dielectric film (insulating film), a semiconductor film, or a conductor film so that both hemispherical surfaces are composed of different materials 402 (black) and 403 (white). In a liquid medium 404, each ball is caused to have mutually different charged states, i.e., a state 405 at the black hemisphere and a state 407 at the white hemisphere, so that the entire minute ball functions like a dipole 409. By placing the minute ball in a controlled outer electric field, the minute ball is twisted in a controlled manner so that its white hemispherical surface or black hemispherical surface is faced toward a viewer's side, thereby effecting objective display.

Such a display system based on a mechanical movement is very stable against an electrically disturbing noise, and does not require a consistent power supply for the display because of its memory characteristic. Further, as the reflection and scattering of natural light on the ball surfaces are utilized for the display, it is possible to provide an ideal display system capable of suppressing eye fatigue as caused due to flickering of a light source, etc., as encountered in a liquid crystal display device or a CRT (cathode ray tube) display system.

According to Sheridon, et al., the charged state of a minute ball is determined by zeta ($\zeta$) potential, as will be further described with reference to FIG. 4B. In FIG. 4B, the ordinate $\Phi$ represents a potential in proximity to a boundary between the ball surface 402 and the liquid 404, and the abscissa d represents a distance from the ball surface 402. As shown in FIG. 4B, at the solid-liquid boundary, there is formed an electric double layer including a surface charge layer comprising ions 405 specifically adsorbed onto the ball surface and an ionic dispersion layer 406 comprising a distribution of ions corresponding to the surface charge. The zeta potential is defined as the potential at a boundary between a liquid layer moving integrally with the ball and an outer liquid layer (i.e., a potential at a slippage boundary in a boundary dynamic potential measurement) in a strict sense but, approximately, may be regarded as the surfacemost potential $\phi_S$ of Stern layer 410, i.e., the specific ion adsorption layer.

Thus, it is assumed that the charge states of a minute ball as proposed by Sheridon or Saito, are determined based on the zeta potential, i.e., the potential developed by ions contained in the liquid and specifically adsorbed onto the solid surface. However, such an ion adsorption state is generally affected by factors, such as physical properties of the liquid, ionic impurities concentrations in the liquid and species of ionic impurities, in addition to the physical properties, such as electron state, species and density of functional groups, at the solid surface. Accordingly, the charge state of a known minute ball is sensitive to changes in factors of the liquid side, such as changes in ion concentration and ion species in the liquid, and is remarkably changed corresponding to a temperature change, mixing of impurities during the production process and a change with time. This is problematic. Accordingly, it is required to improve the stability of charge state of minute balls in order to realize the stability of display characteristics, from the viewpoints of thermal characteristic, process and continuous performance.

In addition to the stability of charge state, the provision of an increased charge is another problem. In the above-described system, the charge quantity on a minute ball due to adsorption of ions in the liquid is increased in proportion to the ion concentration in the liquid. However, an excessively large ion concentration in the liquid results in an increase in reverse electric field due to ionic polarization at the time of external voltage application, so that the charge quantity is inherently restricted. Thus, it has been desired to provide improvements in basic display performance, such as an increased response speed and a lower drive voltage, by further increasing the charge quantity without increasing the ion concentration in the liquid.

In order to solve the above-mentioned problems, as briefly illustrated in FIG. 5, JP-A 7-168210 has proposed to form a minute ball 51 of a ferroelectric material, thereby imparting an electric dipole moment as a bulk property, thus realizing a stably large charge. More specifically, a minute ball 51 formed of a ferroelectric material is polarized under a high electric field, thereby orienting polarized domains 52 present in the entirety of the minute ball uniformly in one direction. As the ferroelectric material, there are enumerated ferroelectric ceramic materials, such as PZT (lead zirconate titanate) barium titanate and PLZT (lead lanthanum zirconate titanate), and also a ferroelectric organic polymer, such as PVDF (polyvinylidene fluoride).

However, the use of a ferroelectric ceramic material, such as PZT, is accompanied with not only a problem of expensive material cost but also problems such that a commercially feasible process for shaping thereof into minute balls has not been established and requires cutting and abrasion leading to a high production cost.

As for ferroelectric organic polymers, only limited species of PVDF, vinylidene fluoride/trifluoroethylene copolymer, and vinylidene fluoride/tetrafluoroethylene copolymer, have been known, and they are more expensive than commercially available major polymers. Further, it is also known that such a limited species of ferroelectric polymer requires a specific production process in order to exhibit required ferroelectricity. More specifically, in order to have such a polymer exhibit ferroelectricity, it has been known to be necessary to orient its polymer chain in a uniaxial direction. For example, for the production of a ferroelectric film, a melt-extruded film thereof is mechanically stretched at a ratio of 3–4 times so as to uniaxially orient the main chain thereof.

The above-mentioned JP-A 7-168210 lacks a specific disclosure about a process for production of ferroelectric balls of organic polymer, such as PVDF and, as far as we know, no report has been made that ferroelectricity of PVDF balls has been confirmed. It is believed practically difficult to produce minute polymer balls wherein polymer main chains are uniaxially oriented to develop ferroelectricity, by a commercially feasible process for production of such minute polymer balls, such as emulsion polymerization, suspension polymerization, or spraying or ejection from a nozzle.

SUMMARY OF THE INVENTION

In view of the above-mentioned problems, an object of the present invention is to provide a system wherein a colored ball is charged not by adsorption of ions from the liquid onto the ball surface but by electret formation by injection of an external change into the surface region of a colored ball or a film coating the surface of a colored ball.

More specifically, according to the present invention, there is provided a display device, comprising: a colored ball having two surface portions of mutually different optical characteristics, and an optically transparent sheet having therein a cavity for containing the colored ball so as to allow a rotation of the colored ball in response to an external electric field applied thereto, thereby effecting a display; wherein the colored ball comprises a paraelectric material and has a spontaneous polarization provided with two surface portions of mutually different charged states, at least one of the two different charged states having been formed through electret-forming charge-injection to the paraelectric material.

According to another aspect of the present invention, there is also provided a colored ball for a display device as described above.

According to the present invention, there is further provided a process for producing a colored ball having two surface portions of mutually different optical characteristics, comprising: a step of forming a ball of paraelectric material having two surface portions of mutually different charged states through electret-forming charge-injection to the paraelectric material.

According to still another aspect of the present invention, there is provided a process for producing a display device of the type comprising: a colored ball having two surface portions of mutually different optical characteristics, and an optically transparent sheet having therein a cavity for containing the colored ball so as to allow a rotation of the colored ball in response to an external electric field applied thereto, thereby effecting a display; wherein said process comprising a step of forming a ball of paraelectric material having two surface portions of mutually different charged states through electret-forming charge-injection to the paraelectric material.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 7 is a sectional illustration of a display device according to the invention for illustrating a display principle thereof.

FIGS. 9A and 9B are a plan view and a sectional view, respectively, of a display device prepared in Example 4 of the invention.

DESCRIPTION OF THE PREFERRED EMBODIMENTS

Some embodiments of the colored ball according to the present invention will now be described with reference to FIGS. 6A–6C.

Figure 6A:
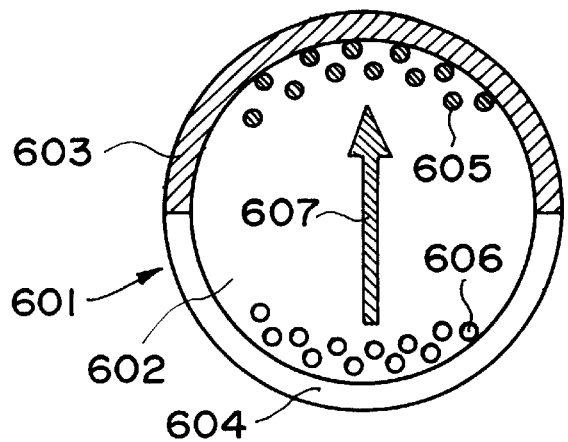
FIGS. 6A–6C are each a sectional illustration of an organization of a colored ball in the form of an electret according to an embodiment of the invention.

FIG. 6A shows a colored ball 601 comprising a main body of minute ball 602 having surface regions into which charges have been injected from outside by corona discharge, etc., as an electret-forming treatment thereby providing a spontaneous polarization 607 to the entirety of the minute ball 602.

Figure 6B:
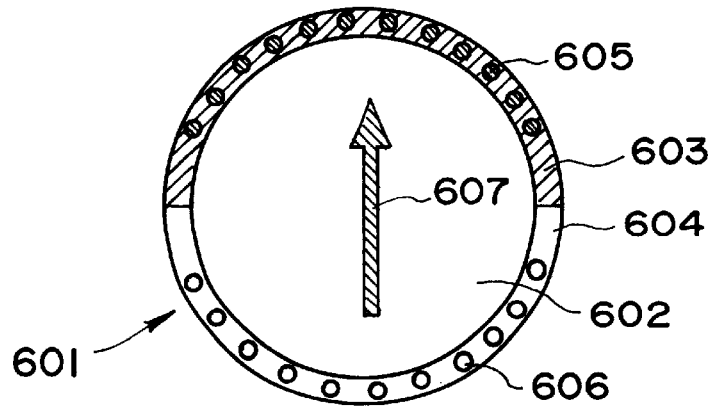

FIG. 6B shows a colored ball 601 comprising a minute ball 602 coated with films 603 and 604 into which charges have been injected from the outside by corona discharge, etc., as an electret-forming treatment, to provide the colored ball 601 with a spontaneous polarization.

Figure 6C:
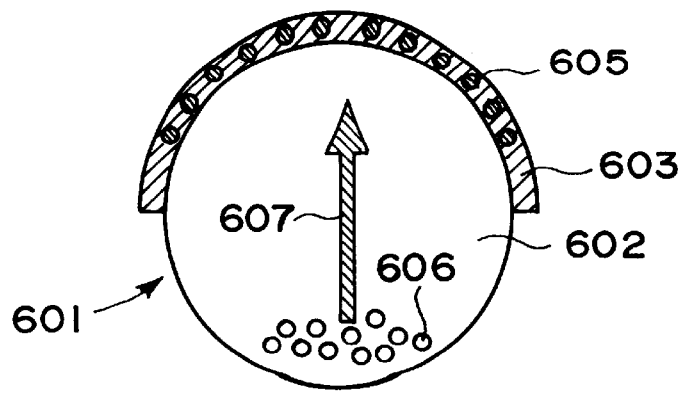

FIG. 6C shows a colored ball 601 comprising a minute ball 602 having a hemispherical surface portion coated with a film 603, and charges 605 and 606 have been injected from outside by corona discharge, etc., as an electret-forming treatment into the film 603 and a surface region of the minute ball 602, respectively, to provide the colored ball 601 with a spontaneous polarization 607.

According to the above embodiments of FIGS. 6A–6C, the amount of ions or electrons forming spatial charges (positive: 605, negative: 606) injected from outside to the colored ball 601 can be controlled, so that the charge of the colored ball 601 can be increased in an environment of suppressed reverse electric field, thus increasing the response speed by rotation of the colored ball 601.

In the above embodiment, it is possible to effect an electret-forming treatment for injecting only one of positive charge 605 and negative charge 606 into, e.g., either the film 603 or 604 in the embodiment of FIG. 6B.

The electret-forming material used in the present invention comprises a paraelectric material, which is defined herein as a dielectric material capable of having a spontaneous or persistent polarization by charge injection from outside to form an electret and free from crystalline spontaneous polarization or polarization inversion characterizing a ferroelectric material. More specifically, the electret-forming material constituting the minute ball 602 and/or films 603 and 604 may comprise such a paraelectric material in general, inclusive of an inorganic material, such as glass, and various organic polymer materials. Among these, it is desirable to use an organic polymer which is inexpensive in material cost and allows a selection of an inexpensive production process, such as emulsion polymerization or suspension polymerization.

More specifically, a paraelectric polymer used in the present invention may be selected from a wide variety of commercially available major polymers, such as polyethylene, polypropylene, polystyrene, polymethyl methacrylate, polyvinyl chloride, polyethylene terephthalate and polyimide, and various fluorine-containing resins. Fluorine-containing resins, such as polytetrafluoroethylene, are particularly suitable in respect of performance.

The use of such a widely used or general-purpose polymeric material as described above as the paraelectric material for constituting the minute balls or films thereon, is advantageous in respects of material cost, availability of inexpensive production process, such as emulsion polymerization or suspension polymerization, and also easy productivity of polymer films on easily available inexpensive inorganic minute balls, such as glass balls and zirconia balls, all favoring easy production of colored balls at a low production cost.

The function of such a colored ball of the present invention produced through an electret-forming treatment will be described with reference to FIGS. 1A and 1B.

Figure 1A:
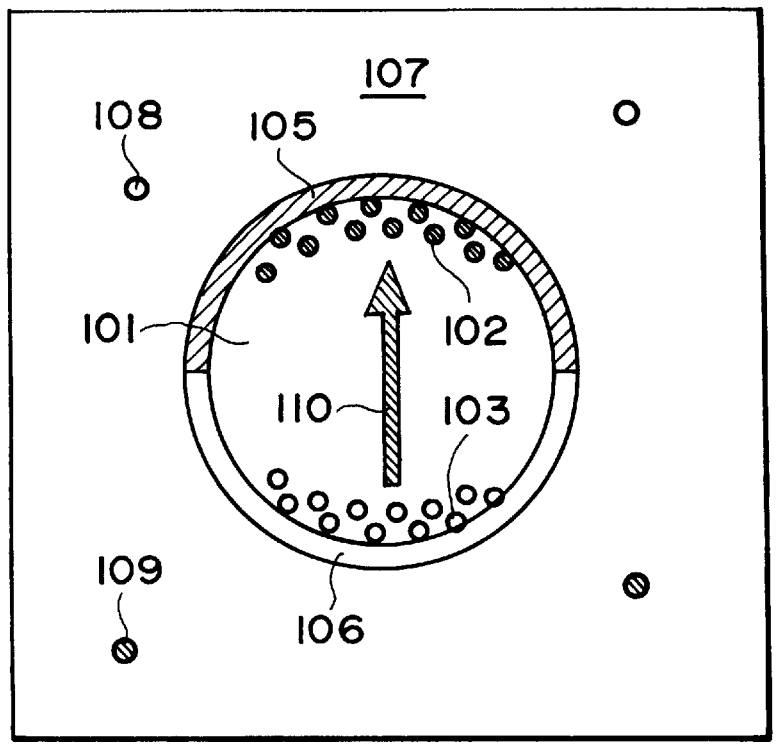
FIG. 1A illustrates an organization of and generation of a polarization in a colored ball in the form of an electret according to the invention.

Referring to FIG. 1A, a minute ball 101 comprising a paraelectric material includes an upper hemispherical surface coated with a black coloring layer 105 and a lower hemispherical surface coated with a white coloring layer 106. Through an electret-forming treatment applied to the minute ball 101, spatial charges 102 and 103 of ions or electrons injected from outside are formed in the interior of the minute ball 101. As a result, a spontaneous polarization 110 is developed in the colored ball, so that the colored ball as a whole functions as a kind of dipole 110.

Figure 1B:
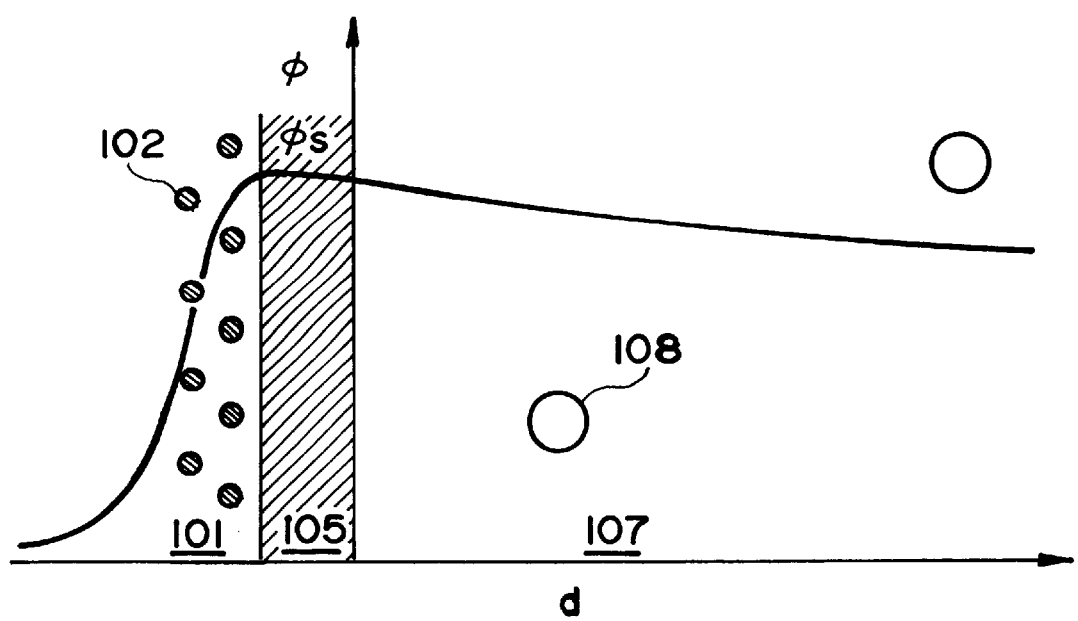
FIG. 1B illustrates a potential distribution developed in the vicinity of the surface of the colored ball placed in an insulating liquid.

When such a colored ball is placed in an insulating liquid 107, a potential distribution as shown in FIG. 1B is developed in the vicinity of the colored ball including the minute ball 101, coloring layer 105 and insulating liquid 107. In Figure 1B, the ordinate $\phi$ represents a potential and the abscissa d represents a distance from the surface of the colored ball. The vicinity of the colored ball surface is charged with a spatial charge 102 generated by the electret-forming treatment to develop a surface potential $\phi_S$.

The transparent insulating liquid 107 having a function of allowing smooth rotation or twisting of the colored ball may contain a polar ion-adsorbent, such as alumina or silica, whereby the ion concentration in the liquid 107 is suppressed at a low level and the liquid retains a high degree of insulating property as represented by a volume resistivity on the order of $10^{11}$ to $10^{14}$ ohm.cm. Accordingly, the amount of charge possibly caused by adsorption of ions from the insulating liquid 107 to the colored ball surface is at a negligible level compared with the amount of charge provided by the electret-forming treatment.

As described above, the charged state of the colored ball according to this embodiment is determined not by ion adsorption from the insulating liquid 107 but by charges injected from outside by an electret-forming treatment, such as corona discharge, so that the amount of charge can be increased by optimization of the ball material and electret-forming treatment conditions while suppressing the ion concentration in the insulating liquid which can lead to the formation of a reverse electric field.

<Electret-forming treatment>

"Electret" has been named after "magnet" based on their similarity and is a material persistently retaining induced polarization to provide an external electric field thereof. The production thereof was first reported by Eguchi (Phys.-Math. Soc. Japan, Ser. 3, Vol. 2, No. 7, (1920)). An electret-forming treatment is applicable to most dielectric materials but has been representatively applied to various organic films. The resultant organic polymer electrets have been widely commercially used as a vibration film for audio devices such as microphones and headphones, and organic polymer electret fiber for electrostatic filter and cleaner.

An electret is formed through polarization and retainment (or freezing) thereof. In this embodiment, the retainable or persistent polarization is set up by spatial charges formed by microscopic or macroscopic displacement of ions contained in a paraelectric material, anisotropic alignment of intramolecular dipole composed of a polar group, etc., by an external electric field, or charge injection by corona discharge or by irradiation with high energy radiation.

A spatial charge caused by ion charge separation or a polarized charge by dipole alignment provides a hetero-charge of a polarity different from that of an external field application electrode, and a spatial charge caused by charge injection from an external electrode as by corona discharge provides a homo-charge of a polarity identical to that of the external electrode. According to a surface potential measurement after an electret-forming treatment, a charge stably present for a long period after an electret-forming treatment is a homo-charge, the frozen or retained charge given by an electret-forming treatment has been considered to be principally attributable to a spatial charge injected from outside. According to measurement by a thermal stimulation current (TSC), the freezing or retainment of a spatial charge is considered to be caused by a deep trap, etc. of electrons, holes or ions present at non-aligned regions, such as crystal grain boundaries, within a paraelectric body, particularly a region close to the surface thereof.

Electret formation by external charge injection may for example be performed by the following processes:

(1) A paraelectric material heated to a proximity of softening temperature or melting temperature is cooled under application of a high DC electric field (thermo-electret process).

(2) Corona discharge onto a paraelectric material surface or a high DC electric field (up to ca. $10^6$ V/cm) close to a breakdown voltage is applied across a paraelectric material at room temperature (electro-electret process).

(3) Irradiation of a paraelectric material with high-energy radiation (such as electron rays and ζ-rays) in vacuum (radio-electret process).

(4) Application of a high DC voltage onto a paraelectric material under photo-illumination (photo-electret process)

<Production of colored ball>

This embodiment is further characterized by a colored electret ball formation process. In order to drive a colored ball having two hemispherical surfaces colored in two different colors so as to direct the respective colored hemispherical surfaces rightly to the display surface of the display device, it is necessary to have the colored regions and the charged regions of the colored ball coincide with each other. However, it is virtually almost impossible in a mass production process to align a multiplicity of colored balls each already colored in two colors one by one in an identical direction and then apply an electret-forming treatment to each colored ball. Accordingly, in this embodiment, a multiplicity of minute balls are first held in a planar arranged position by a certain means, and the minute balls held in position are successively subjected to an electret-forming treatment and a coloring treatment, thereby having the colored region and the charged region coincide with each other.

The holding of minute balls in position may for example be performed by forming on a substrate already provided with an electrode formed thereon a gel layer or sheet in a thickness nearly equal to the radius of each minute ball and dispersing thereon the minute balls so as to embed the hemisphere of each minute ball, followed by hardening of the gel layer. Then, an upper electrode is disposed on or above the minute balls, and a high DC voltage is applied between the upper electrode and the lower electrode disposed below the gel layer to form an electret in each minute ball. Then, the upper electrode is removed, and the exposed hemispheres of the minute balls are colored by vapor deposition, casting or dipping. Then, the thus-colored minute balls of electret are removed from the hardened gel layer to recover colored balls each having a colored region and a charged region coincident with each other.

As a modification of the above embodiment, minute balls may be first subjected to an electret-forming treatment and the resultant electret-form minute balls are aligned and held in a uniform electric field, followed by coloring of the thus-held minute balls to provide colored balls each having a colored region and a charged region coincident with each other. The electret-forming treatment may for example be performed by subjecting minute balls held in position to application of a high electric field between two metal electrode sheets, or external charge injection by corona discharge or irradiation with electron beam or ion beam. It is also possible to effect an electret-forming treatment simultaneously with formation of minute balls. For example, it is possible to eject a molten polymer through a nozzle appling a high electric field to the ejected droplets and then cool and solidify the ejected droplets supplied with a high electric field to provide minute balls in the form of an electret.

In the case of subjecting a polymer film formed on minute balls to an electret-forming treatment, it is preferred to form a polymer film containing a pigment therein and functioning also as a coloring layer. In this case, the treatments may be performed not only in the order of an electret-forming treatment and then a coloring layer formation but also in the order of a coloring layer formation and then an electret-forming treatment. In this case, it is preferred that the coloring layer is subjected to charge injection as an electret-forming treatment.

In this embodiment, the cavity for containing therein the colored ball is filled with an insulating liquid preferably having a volume resistivity of at least $10^{10}$ ohm.cm, more preferably at least $10^{12}$ ohm.cm.

In order to provide such an insulating liquid, it is effective to incorporate ultra-fine particles of polar ion-adsorbent such as alumina or silica in a lubricating liquid and/or a cavity providing transparent sheet structure in a proportion of several %, e.g., 1 to 10 wt. %. It is also possible to fill the cavity containing the colored ball with a gas or place the cavity in vacuum.

<Drive of a display device>

An embodiment of a display device for driving a colored ball shown in FIG. 1A is described with reference to FIG. 7.

Referring to FIG. 7, a display device according to this embodiment including a display medium comprising a plurality of colored balls 11 (only one being shown) each comprising a minute ball 101 having hemispherical surfaces coated with a black layer 105 and a white layer 106, respectively, and a transparent support sheet 5 provided with cavities 7 (only one being shown) each filled with a transparent insulating liquid and containing such a colored ball 11 rotatably therein; and drive means comprising a power supply 8 and electrodes 6 and 6a connected to the power supply 8 for rotating the colored ball 11 so as to direct one of the black layer 105 and the white layer 106 to the viewer's side.

Each minute ball 101 has surface regions including one where a positive charge 102 is generated close to the black layer 105 and one where a negative charge 103 is generated close to the white layer 106, respectively by charge injection from outside according to the electret-forming treatment. As a result, the respective surface regions of the colored ball 11 are provided with mutually different charged states, thereby providing the colored ball 11 with a dipole moment 110. When the colored ball 11 is placed in an electric field, a torque is caused to act on the colored ball so as to direct the dipole moment 110 in the electric field, thereby directing one of the hemispherical surfaces toward a viewer's side.

More specifically, as shown in FIG. 7, when the vicinity of the white layer 106 is negatively charged and the vicinity of the black layer 105 is positively charged, the white layer 106 is directed to the electrode 6 connected to the positive electrode of the supply 8 and the black layer 105 is directed to the electrode 6 connected to the negative electrode of the supply 8, thus to the viewer's side. As a result, the colored ball 11 appears to be dark in the illustrated position and appears to be white when the colored ball 11 is inverted by application of a reverse electric field to direct the white layer 106 to the viewer's side, respectively under illumination with natural light.

FIG. 7 illustrates a display device in a size of one pixel 10, but an actual display device is generally composed of a multiplicity of such pixels 10.

Each minute ball 101 may preferably have a diameter of at most 500 μm, so as to be smaller than one pixel size of a display device. A diameter of 5–200 μm is more suitable in view of practical processes for formation of colored balls and cavities.

Each cavity 7 may preferably have a size which is a little larger than that of the colored ball 11 so as to prevent the displacement of the colored ball to the maximum and provide the resultant display state with a memory characteristic. More specifically, the cavity diameter may preferably be larger than that of the colored ball by 5–30 µm, more preferably 10–20 µm.

The colored layers 105 and 106 should have mutually different optical characteristics which are discriminatable as a difference in color hue and/or intensity of reflected light when observed from the viewer's side. By coating at least a surface portion of a minute ball 101 with a coloring layer, two surface portions can be provided with mutually different optical characteristics providing a difference in color and/or intensity of reflected light.

The coloring layers 105 and 106 may preferably comprise a material which is stable in the transparent insulating liquid filling the cavity 7, has a sufficient mechanical strength and exhibits a good adhesion onto the ball surface. The colors of the coloring layers are not restricted to white and black but can also be other colors, such as yellow, magenta and cyan.

The cavity 7 need not be necessarily filled with a transparent insulating liquid but can be placed under vacuum or filled with a gas. This is because the charged states on the colored ball surfaces are not provided by adsorption of ions from a liquid to the colored ball 11 surface. Thus, any medium inclusive of vacuum or a gas can be used if it allows the smooth rotation of a colored ball in the cavity 7.

Of the electrodes 9 and 9a used for driving the colored ball 11, at least the electrode should be transparent so as to allow the observation of the surface color of the colored ball 11 from the viewer's side. Such a transparent electrode may be provided as a film of a transparent conductor, such as $SnO_2$, $TiO_2$, ZnO or ITO.

The support sheet (optically transparent sheet) 5 should be optically transparent so as to allow the observation of the colored ball 11 and may comprise a flexible or rigid resin, such as polyethylene or polystyrene; a transparent elastomer, such as silicone rubber; or glass.

The display device of the present invention may be applicable to a light-receiving type display device for displaying picture data, such as characters, graphics and video images; and also applicable to a so-called paper display, which allows an observation, a movement, writing, copying thereon, readout and erasure of an image thereon, therein and therefrom, like a paper sheet.

Hereinbelow, the present invention will be described with reference to some specific examples.

EXAMPLE 1

In this example, colored balls were prepared by subjecting minute balls held in position to an electret-forming treatment and a coloring treatment successively. The electret-forming treatment was effected by a thermo-electret process of applying an electric field at an elevated temperature.

Figure 2A:
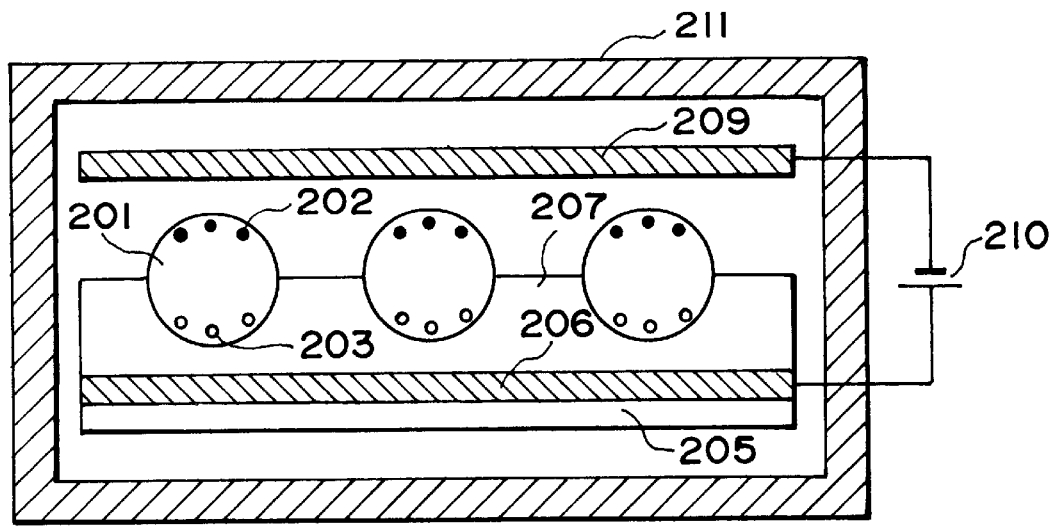
FIGS. 2A–2C illustrate a process for producing a colored ball in the form of an electret according to an embodiment of the invention.

More specifically, colored balls were prepared in the following manner. Referring to FIG. 2A, white-colored minute balls 201 having an average diameter of 50 µm were formed of polymethyl methacrylate containing 5–10 wt. % of a white pigment of titanium oxide as a paraelectric material. Onto an Al-made lower electrode 206 formed on a glass substrate 205, a PVA (polyvinyl alcohol)-based paste (207) was applied in a thickness almost equal to the radius of the PMMA balls 201, and the PMMA balls 201 were dispersed onto the paste (207), followed by heat-curing of the paste to form a PVA sheet 207 wherein the PMMA balls 201 were half embedded to be held in position.

The PVA sheet 207 carrying the PMMA minute balls was stored in a thermostat vessel 211 together with an upper metal electrode 209 disposed above the PVA sheet 207 with a gap of 100 µm and held at temperature 5° C. below the melting point (160° C.) of PMMA. In this state, a voltage of 5 kV was applied for 5 min. between the upper metal electrode 209 as a negative electrode and the lower Al electrode 206 disposed below the PVA sheet 207 from a high-voltage supply 210, and the temperature within the thermostat vessel 211 was gradually lowered to effect an electret-forming treatment. In this way, by cooling the PMMA balls 201 under application of a high electric field from a temperature just below the melting point to room temperature, a positive space charge 202 and a negative space charge 203 were generated within the PMMA balls 201 by injection of ions and electrodes from the upper and lower electrodes, and retained therein, to form minute balls 201 in the form of an electret (FIG. 2A).

Figure 2B:
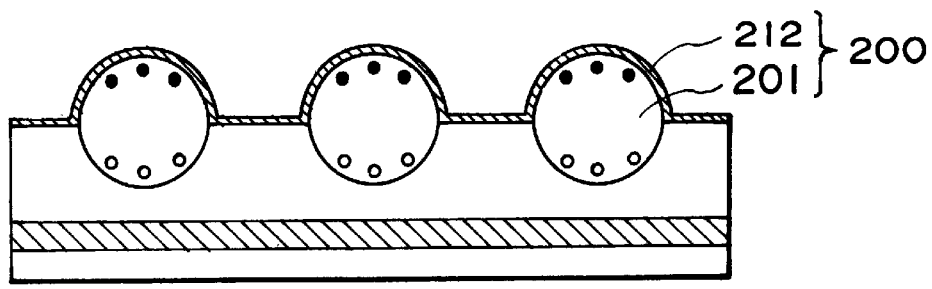
Figure 2C:
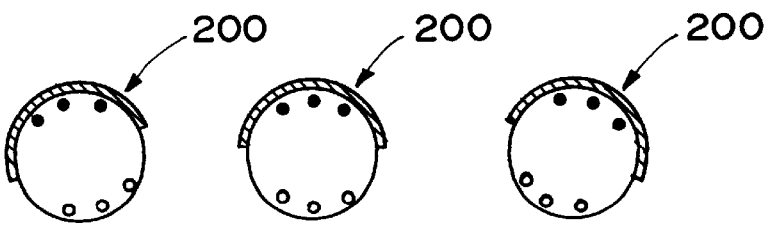

Then, the upper electrode 209 was removed, and the exposed hemispherical surfaces of the minute balls were coated with a 100 nm-thick carbon layer 212 as a black coloring layer by CVD (chemical vapor deposition) process (FIG. 2B). Finally, the supporting PVA sheet 207 was removed by dissolution in hot water to recover colored balls 200 each having a colored region and a charged region almost coincident with each other (FIG. 2C).

The thus-prepared colored balls 200 were subjected to a sheet-form device-forming process similar to the above-mentioned process of Sheridon including mixing thereof with an elastomer, formation of a sheet of the mixture and curing thereof, and dipping for swelling of the elastomer sheet in silicone oil to form cavities surrounding the colored balls.

More specifically, the above-prepared colored balls were dispersed in a two-liquid type silicone rubber ("SILPOT 184", mfd. by Dow Corning Corp.).

Then, the resultant dispersion mixture was extended over a glass substrate into a film of ca. 100 µm in thickness, which was then heat-cured at 100° C. for 1 hour.

Then, the cured rubber sheet containing colored balls dispersed therein was peeled apart from the glass substrate and dipped in silicone oil having a viscosity of 1 cSt (mfd. by Toshiba Silicone K.K.) for 24 hours to swell the rubber sheet and form cavities (having a gap of 5–10 µm) each filled with the silicone oil and surrounding one colored ball. Then, the thus-swollen rubber sheet was sandwiched between a pair of glass substrates each having an ITO electrode film on its inner surface to prepare a display device.

When voltages of ±50 volts were applied between the pair of ITO electrodes, the display device exhibited a black display state or a white display state selectively depending on the polarity of voltage by rotation of the colored balls within the cavities to direct their black hemispherical surfaces or white hemispherical surfaces toward the viewer's side. The response time was ca. 5 msec. The display exhibited a contrast ratio of ca. 6:1 and a viewing angle range of ±85 deg. or larger. When the electric field was positive on the viewer's side, the white hemispherical surfaces were observed, and when the electric field was reversed the black hemispherical surfaces were observed. Further, the response time was ca. 1/10 of that attained in a prior art device. Accordingly, it was confirmed that desired levels of charged states including polarity and charged amounts were accomplished. Further, the stability of performances against temperature change and lapse of time was confirmed, so that the effects of the present invention were exhibited as expected.

EXAMPLE 2

In this example, colored balls were prepared by subjecting minute balls first to an electret-forming treatment and then to a coloring treatment. The electret-forming treatment was effected by an electro-electret process of effecting charge injection by corona discharge under application of a high electric field.

Figure 3A:
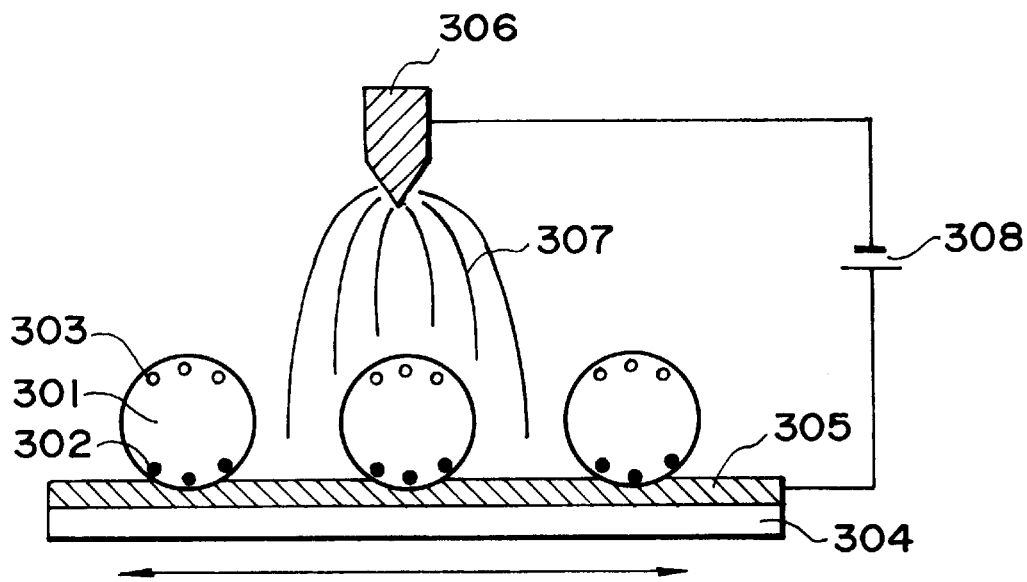
FIGS. 3A–3C illustrate a process for producing a colored ball in the form of an electret according to another embodiment of the invention.

More specifically, colored balls were prepared in a manner as will be described with reference to FIGS. 3A to 3C. Referring to FIG. 3A, black-colored minute balls 301 having an average particle diameter of 50 $\mu$m were formed of polyethylene (PE) as a paraelectric material containing 5–20 wt. % of a black pigment, such as carbon black or aniline black, dispersed therein. Onto an electroconductive adhesive layer 305 formed on a glass substrate 304, the above-mentioned black-colored PE balls 301 were dispersed to be held in position.

Above the glass substrate 304, a knife edge-shaped electrode 306 was disposed with a gap of 200 $\mu$m, and a DC voltage of 10 kilo-volts was applied between the knife edge-shaped electrode 306 as the negative electrode and the electroconductive adhesive layer 305 from a high voltage supply 308 to cause corona discharge 307 between the electrodes while moving the substrate 304 laterally at a constant speed of 1 m/min. for one reciprocation in directions of arrows by a lateral drive mechanism (not shown) so as to uniformly illuminate the PE balls with the corona discharge 307 to effect an electret-forming treatment. As a result, a negative homo-charge 303 was injected into surface portions of the PE balls 301 on the side of the edge electrode 306, and on the electroconductive adhesive layer 305 side, a positive homogeneous charge 302 was injected into surface portions of the PE balls 301 due to microscopically generated corona discharge, etc., thus forming electret balls (FIG. 3A).

The PE balls 301 in the form of electrets were then recovered from the electroconductive adhesive layer 305 and then, after washing, were charged into a vessel 311 containing a lower flat electrode 312 at the bottom and pure water 310 in a depth of ca. 5 mm above the electrode 312. As a result of control of the specific gravity and surface energy, the minute PE balls 301 were floated at the water surface so that only hemispherical surfaces of the PE balls 301 were exposed above the water surface.

Figure 3B:
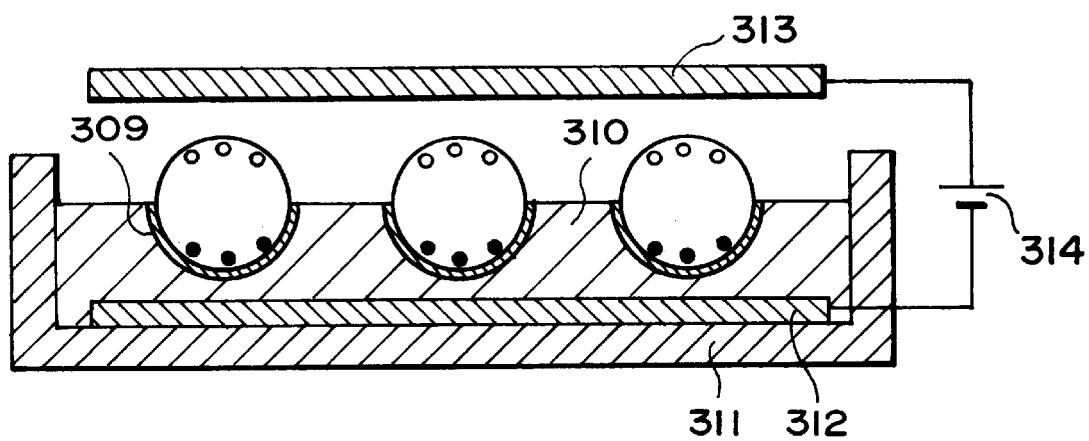
Figure 3C:
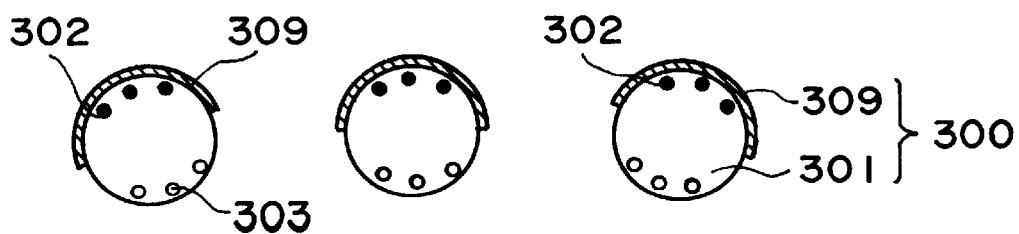
Figure 4A:
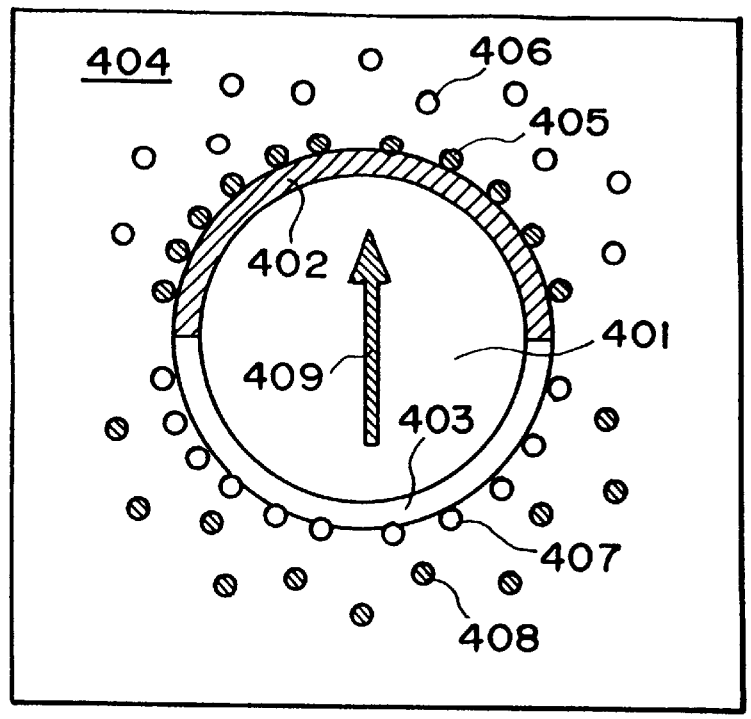
FIG. 4A illustrates an organization and generation of a polarization in a colored ball of prior art.
Figure 4B:
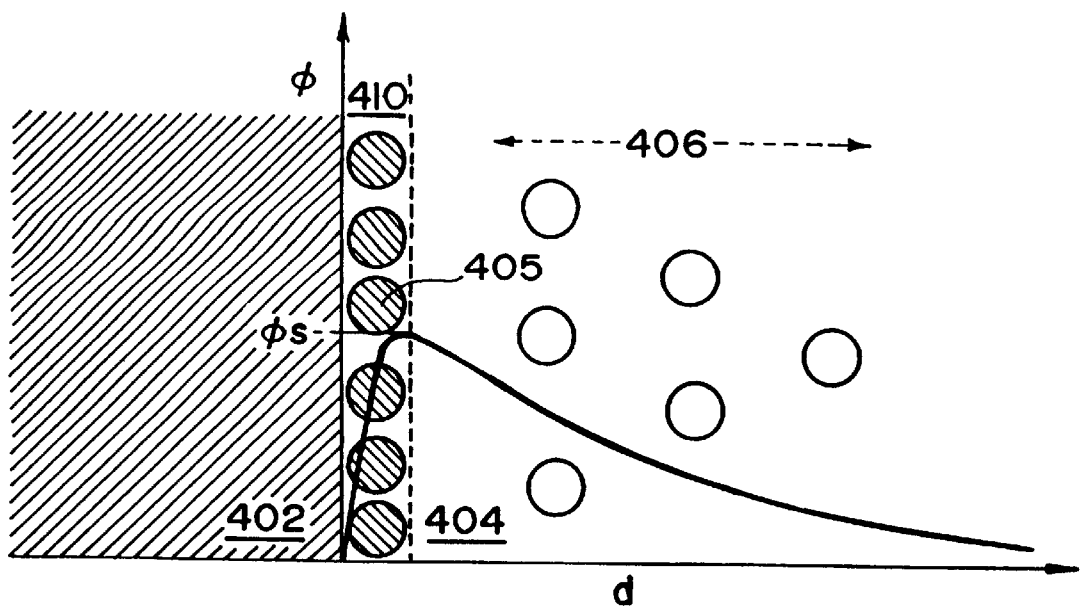
FIG. 4B illustrates a ζ (zeta) potential distribution developed in the vicinity of the surface of the colored ball.
Figure 5:
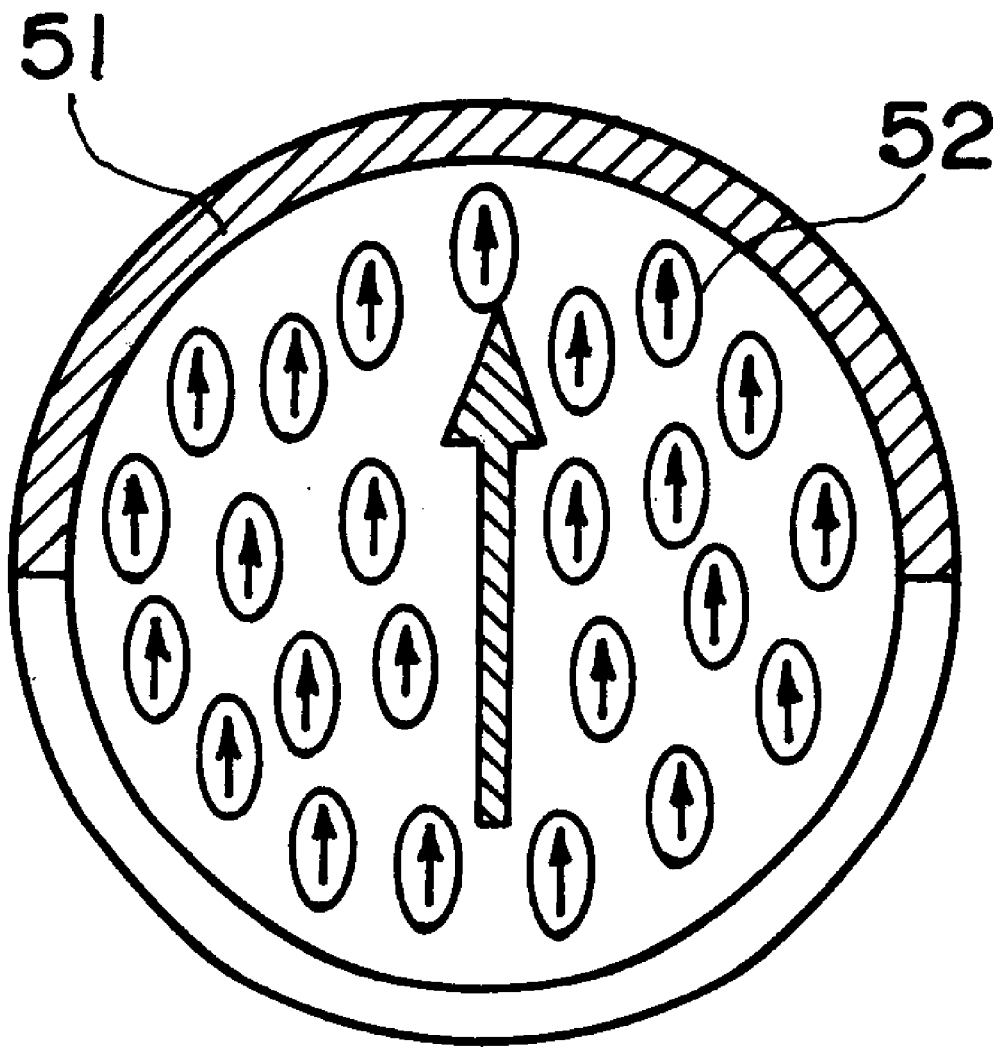
FIG. 5 illustrates a polarization developed in a known colored ball of a ferroelectric material.

Then, an upper flat electrode 313 was held at a position 200 $\mu$m above the water surface, and a DC voltage of 200 volts was applied between the upper electrode 313 as a positive electrode and the lower electrode 312 from a high voltage supply 314, whereby the electret-form minute PE balls were uniformly aligned with their dipole moment directed in the electric field direction (FIG. 3B). In this state, an appropriate amount of plating solution comprising nickel sulfate, sodium acetate, sodium citrate and sodium hypophosphite was added to the pure liquid to form an electrolytic solution 310, whereby only hemispherical surfaces dipped in the solution 310 were chemically plated with a white metal nickel film 309. Then, the thus-plated PE balls were recovered and washed to provide colored balls 300 having a white colored region 309 and a charged region 302 nearly coincident with each other (FIG. 3C).

Incidentally, the specific gravity and surface energy of the PE balls 301 were adjusted in advance so that only hemispheres thereof were just exposed above the plating solution.

The thus-prepared colored balls 300 were formulated into a sheet-form display device in a similar manner as in the above Example 1. The display device exhibited performances similar to those of the device of Example 1 including charged states of polarity and charged amount, stable performances against temperature change and lapse of time, thus exhibiting effects of the present invention at an expected level.

EXAMPLE 3

Figure 8A:
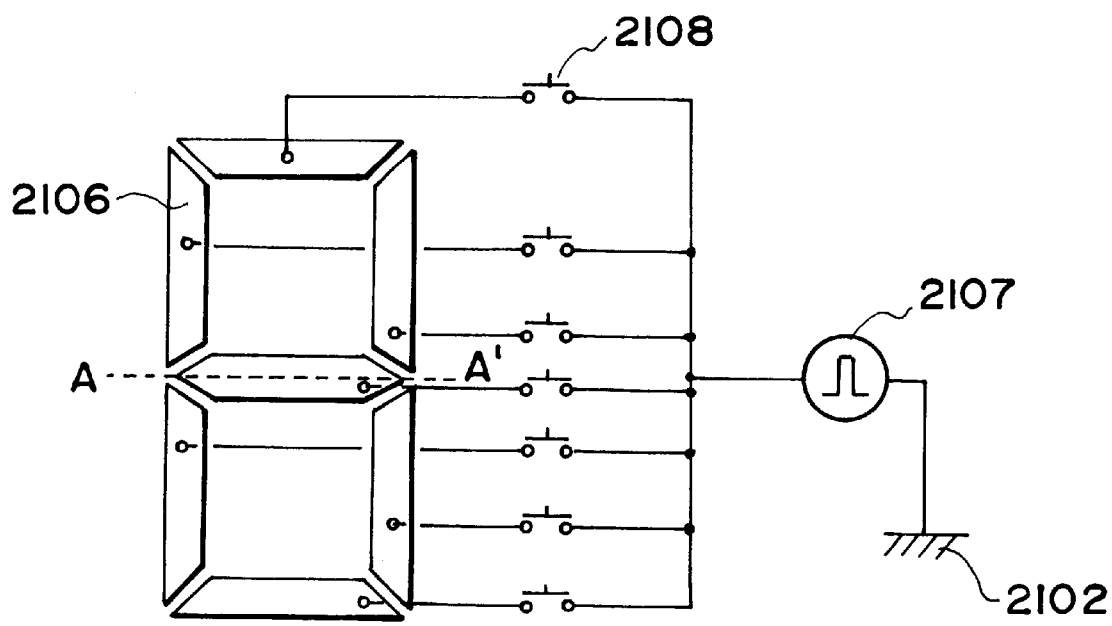
FIGS. 8A and 8B are a plan view and a sectional view, respectively, of a display device prepared in Example 3 of the invention.
Figure 8B:
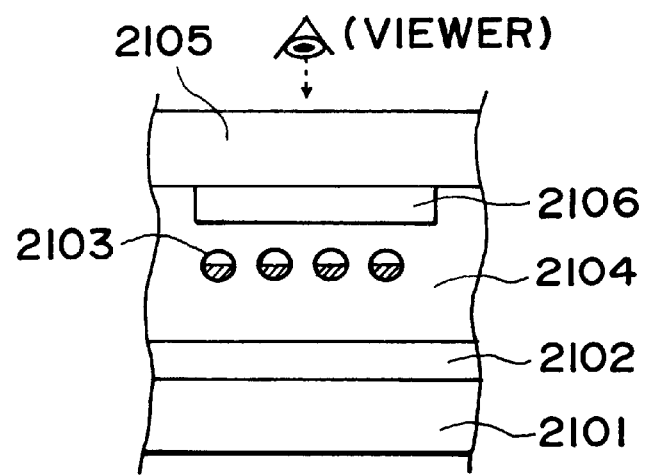

The sheet-form display device of Example 1 was formulated into a display device as shown in FIGS. 8A (a plan view) and 8B (a sectional view taken along an A–A' line in FIG. 8A).

More specifically, on a lower ITO electrode 2102 coating an entire surface of a 100 $\mu$m-thick PET film 2101, a rubber sheet 2104 containing therein colored balls 2103 in the form of an electret as prepared in Example 1 before being sandwiched by a pair of ITO electrodes for forming a display device was disposed, and a 100 $\mu$m-thick PET film 2105 having thereon an ITO electrode film 2106 in a conventional 7-segment pattern was superposed with its patterned electrode film 2106 directed downward and press-bonded against the rubber sheet 2104. In a region of each segment electrode 2106, a plurality of colored balls 2103 were dispersed. All the upper segment electrodes 2106 were connected with a pulse generator 2107 and supplied with a rectangular pulse having a pulse height of 100 volts and a pulse width of 50 msec to apply the corresponding voltage across the rubber sheet 2104 between the upper segment electrodes 2106 and the lower common electrode 2102 placed at the ground potential, thereby placing all the segments in a white display state. Then, arbitrary ones elected from the upper segment electrodes 2106 were supplied with a pulse of the opposite polarity, the corresponding display segments were selectively turned into a black display state due to rotation of the colored balls, whereby the possibility of a known type of display by arbitrary combination of 7 segments was confirmed. Further, it was also confirmed that a black display segment could be converted into a white display segment by application of a pulse of further opposite polarity (i.e., the same polarity as the display of all white segments).

EXAMPLE 4

A row-column matrix-type display device was prepared by replacing the 7-segment electrode arrangement with a combination of lower stripe ITO electrodes 2112 and upper stripe ITO electrodes 2113 which were respectively disposed in a width of 40 $\mu$m and a spacing of 40 $\mu$m from each other. Each intersecting area of the row (lower) stripe electrodes 2112 and column (upper) stripe electrodes 2113 constituted a pixel where a plurality of colored balls 2103 were disposed. A configuration of a partial structure of the thus constituted row-column matrix type display device is illustrated in FIG. 9A (a plan view) and 9B (a sectional view) taken along a lien B–B' in FIG. 9A). When a rectangular pulse having a pulse height of 100 volts and a pulse width of 50 msec generated from a pulse generator (not shown) was applied between all the lower electrodes 2112 and all the upper electrodes, the entire display area was placed in a white display state. Then, a pulse voltage of the opposite polarity was applied between arbitrarily selected lower electrodes 212 and upper electrodes 2113, whereby pixels at the intersections of the thus-selected lower and upper electrodes were converted into a black display state due to rotation of the colored balls. In this way, it was confirmed possible to form a black display state at a desired region by a selective combination of electrodes between which a pulse voltage was applied. Further, it was also possible to return such a black-display pixel again to a white-display pixel by applying a pulse of a polarity opposite to that of a black display-forming pulse.

As described above, in a display device of the type wherein a display state is selected by rotation of colored balls, the charged state of each colored balls is determined not by ion adsorption onto the ball surface from a surrounding liquid but by an electret-forming treatment due to charge injections to the colored balls per se or to a film coating the colored balls, whereby the amount of the charge possessed by a colored ball is increased to provide improvements in basic display performances, such as an increased response speed and a lower drive voltage.

Further, as the colored balls are composed from a paraelectric material, the display performances can be stabilized thermally and with time by using inexpensive material and process.

What is claimed is:

1. A colored ball for a display device, having two surface portions of mutually different optical characteristics; wherein the colored ball comprises a paraelectric material and has a spontaneous polarization provided with two surface portions of mutually different charged states, at least one of the two different charged states having been formed through electret-forming charge-injection to the paraelectric material.

2. A colored ball according to claim 1, wherein both of the two different charged states have been formed by electret-forming charge-injection to the paraelectric material.

3. A colored ball according to claim 1, wherein one of the two different charged states has been formed by electret-forming charge injection to the paraelectric material.

4. A colored ball according to claim 1, wherein the electret-forming charge injection to the paraelectric material is performed by corona discharge onto the paraelectric material.

5. A colored ball according to claim 1, comprising a ball of paraelectric material having two surface portions of mutually different charged states formed through electret-forming charge-injection to the ball of paraelectric material, and a coloring layer coating a surface portion of the ball.

6. A colored ball according to claim 1, comprising a ball and a colored layer of paraelectric material, wherein the two different charged states have been provided through electret-forming charge-injection to the colored layer of paraelectric material.

7. A display device, comprising: a colored ball having two surface portions mutually different optical characteristics, and an optically transparent sheet having therein a cavity for containing the colored ball so as to allow a rotation of the colored ball in response to an external electric field applied thereto, thereby effecting a display; wherein the colored ball is a colored ball according to any one of claims 1 to 6.

8. A display device according to claim 7, wherein the cavity in the optically transparent sheet is filled with a transparent insulating liquid.

9. A display device according to claim 8, wherein the transparent insulating liquid contains a polar-ion adsorbent comprising fine particles of alumina or silica.

10. A display device according to claim 7, wherein the cavity in the optically transparent sheet is in a vacuum state or filled with a gas.

11. A process for producing a colored ball having two surface portions of mutually different optical characteristics, comprising: a step of forming a ball of paraelectric material having two surface portions of mutually different charged states through electret-forming charge-injection to the paraelectric material.

12. A process according to claim 11, further including a step of holding the ball having two surface portions of mutually different charged states in a prescribed direction under application of an electric field in a prescribed direction, and a step of forming a coloring layer on at least one of the two surface portions of mutually different charged states.

13. A process for producing a display device of the type comprising: a colored ball having two surface portions of mutually different optical characteristics, and an optically transparent sheet having therein a cavity for containing the colored ball so as to allow a rotation of the colored ball in response to an external electric field applied thereto, thereby effecting a display; wherein said process comprising a step of forming a ball of paraelectric material having two surface portions of mutually different charged states through electret-forming charge-injection to the paraelectric material.

14. A process according to claim 13, further including a step of holding the ball having two surface portions of mutually different charged states in a prescribed direction under application of an electric field in a prescribed direction, and a step of forming a coloring layer on at least one of the two surface portions of mutually different charged states.

* * * * *

UNITED STATES PATENT AND TRADEMARK OFFICE
CERTIFICATE OF CORRECTION

PATENT NO. : 6,072,621

DATED : June 6, 2000

INVENTOR(S) : ETSURO KISHI, et al

It is certified that error appears in the above-identified patent and that said Letters Patent is hereby corrected as shown below:

COLUMN 1:

Line 36, "roate" should read --rotate--.

COLUMN 12:

Line 55, "lien" should read --line--.

COLUMN 13:

Line 33, "charge injection" should read
      --charge-injection--.
    Line 35, "charge injection" should read
      --charge-injection--.

Signed and Sealed this

Twenty-second Day of May, 2001

Attest:

NICHOLAS P. GODICI

*Attesting Officer*     *Acting Director of the United States Patent and Trademark Office*